US006510463B1

(12) United States Patent
Farhat et al.

(10) Patent No.: US 6,510,463 B1
(45) Date of Patent: Jan. 21, 2003

(54) SERVICE QUALITY MONITORING PROCESS

(75) Inventors: Jay Farhat, Foster City, CA (US); Alla Rozenfeld, San Carlos, CA (US); Singam Sunder, San Jose, CA (US)

(73) Assignee: iPass, Inc., Redwood City, CA (US)

( * ) Notice: Subject to any disclaimer, the term of this patent is extended or adjusted under 35 U.S.C. 154(b) by 0 days.

(21) Appl. No.: 09/732,800

(22) Filed: Dec. 7, 2000

Related U.S. Application Data

(60) Provisional application No. 60/207,670, filed on May 26, 2000.

(51) Int. Cl.[7] .......................................... G06F 15/173
(52) U.S. Cl. ........................................................ 709/224
(58) Field of Search ........................................ 709/224

(56) References Cited

U.S. PATENT DOCUMENTS

| | | | | |
|---|---|---|---|---|
| 5,638,514 A | * | 6/1997 | Yoshida et al. | 709/224 |
| 5,815,665 A | | 9/1998 | Teper et al. | |
| 6,023,502 A | | 2/2000 | Bouanaka et al. | |
| 6,026,375 A | | 2/2000 | Hall et al. | |
| 6,028,917 A | | 2/2000 | Creamer et al. | |
| 6,029,143 A | | 2/2000 | Mosher et al. | |
| 6,112,239 A | * | 8/2000 | Kenner et al. | 709/224 |
| 6,167,126 A | | 12/2000 | Janning | |
| 6,269,401 B1 | * | 7/2001 | Fletcher et al. | 709/224 |

FOREIGN PATENT DOCUMENTS

JP        05199327        8/1993

OTHER PUBLICATIONS

Edwards, Morris, "It's a VPN thing. (Technology Information)", Communication News, Aug. 1, 1999, vol. 36, No. 8, pp. 94, ISSN– 0010–3632.

No–Author, "Dial Up with Bay's new Remote Access Concentrator", IT Times, 97–10–21, pp. P.6.

Greene, Tim, "Upstart VPN services staking out new ground", Network World, Apr. 16, 2001, pp. 30, ISSN– 0887–7661.

Salamone, Salvatore, "Simplified Roaming, From POP To POP", Internet Week, 99/02/15, pp. 11, ISSN– 1096–9969.

Brockmann, Peter, "Rapport dialup switch redefines Internet service opportunities", Telesis, 96/12/00, pp. 12–13, ISSN– 0040–2710.

Johnson, Johna Till, "Linking corporate users to the Internet", Data Communications, 93/01/00, pp. 56–58, ISSN– 0363–6399.

Likier, Marty, "Using Dial–Up Technology for Internetworking Applications", Telecommunications, 92/05/00, pp. 52, 54, ISSN– 0278–4831.

Shen Jin; Gu Qiwei; Yin Yu, "8. Research and implementation of proxy server", Journal of Nanjing Univ. Aeronaut. Astronaut. (China), Dec. 2000, vol. 32, No. 6, pp. 620–624, ISSN– 1005–2615.

West, W., "Don't be nervous Yremote access VPNs", Communication News, May 2000, vol. 37, No. 5, pp. 28, 30, 32, ISSN– 0010–3632.

(List continued on next page.)

Primary Examiner—David Y. Eng
(74) Attorney, Agent, or Firm—Blakely, Sokoloff, Taylor & Zafman, LLP

(57) ABSTRACT

A method and apparatus for remote network connection service quality monitoring are disclosed. A connection with a network connection point is established. The network connection performance data is collected and upon successful connection transmitted to a server via a network. A priority list of a plurality of network connection points is modified based on the collected network connection performance data.

44 Claims, 6 Drawing Sheets

OTHER PUBLICATIONS

No–Author, "Companies mix and match VPN, dial–access support", InternetWeek, Jan. 25, 1999, No. 749, pp. VPN20, ISSN– 0746–8121.

Semich, J. William, "56K server supports U.S. Robotics and Lucent—Modems built into Model 8000 from Bay Networks", WebWeek, Aug. 18, 1997, vol. 3, No. 25, pp. 25, ISSN– 1087–3071.

No–Author, "Earthlink Dials Up ClientLogic for Multi–Channel Technical Support", Newswire, Jul. 24, 2001, pp. 2226.

Blass, Steve, "Dr. Internet", Network World, Mar. 11, 2002, pp. 55, ISSN– 0887–7661.

No–Author, "Lucent Technologies Launches Next–Generation Voice Dialing Service for Wireless Networks. (Brief Article)", Aug. 27, 2000, pp. NA.

Silberg, Lurie, "Dialing the Web AT&T's Internet Cellphone Debuts at Mass; Launches PocketNet wireless data service at retail in an attempt to bring cellphone with Internet access to the masses", HFN The Weekly Newspaper for the Home Furnishing Network, 97–10–13, pp. 93.

Guy, Sandra, "Untangling phone frustration, Bellcore solution offers a simpler way to do business", Telephony, 97–06–02, ISSN– 0040–2656.

Sanders, Bob, "Despite nasty shake–out local ISPs are thriving", New Hampshire Business Review, Feb. 23, 2001, vol. 23, No. 4, pp. 1, ISSN– 0164–8152.

Scarcia, Costantino, "Getting On The Net With The Right ISP", New Jersey Business, Sep. 1, 2000, vol. 45, No. 9, pp. 40, ISSN– 0028–5560.

Blanche, Fabian III, "Spicing up the Web", Greater Baton Rouge Business Report, Jul. 18, 2000, vol. 13, No. 23, pp. 94, ISSN– 0747–4652.

No–Author, "Trinagy's New Insight for Dial Access Solution Suite Delivers Proactive Management of Dial–Up Service Offerings", Newswire, Apr. 24, 2001, pp. 2448.

No–Author, "IP Axess Adds Fixed–Wireless Service Provider to Participants in Its Expanding Evaluation Program", Newswire, Apr. 4, 2001, pp. 2225.

No–Author, "Ubrandit.com Adds Gigitel and Zodiac Café to Virtual ISP Client List", Newswire, Oct. 16, 2000, pp. 0709.

No–Author, "Netopia Introduces First ADSL Routers to Offer Integrated Backup Module for "Fast Track" Deployment and Fully Redundant Internet Connectivity", Newswire, May 24, 2000, pp. 0514.9.

No–Author, "Broadmedia Introduces G–Phone DLX IP Phone (Product Announcement)" Tele–Service News, Jun. 1, 2000, vol. 12, No. 6, pp. NA.

International Search Report—PCT/US01/05152, May 9, 2001.

International Search Report—PCT/US01/05724, Jun. 8, 2001.

* cited by examiner

SERVICE QUALITY MONITORING PROCESS

CROSS REFERENCE TO RELATED APPLICATIONS

This application claims the benefit of U.S. Provisional Application No. 60/207,670, filed May 26, 2000.

FIELD OF THE INVENTION

The present invention relates to the field of remote network connections and more particularly to monitoring the quality of network connection points.

BACKGROUND OF THE INVENTION

With the technological developments of the last decade and growing popularity of online commerce, e-mail, online chatting and the Internet in general, the demand to have constant access to these innovative technological ways of communication is rapidly increasing. Some users cannot imagine their lives without the Internet and email; some cannot imagine their lives without being able to buy groceries online. Constant desire to be connected to the informational highway increases demand for reliable, fast, convenient network connection.

Anyone using current technology has dealt with networks at some point. Being connected to a local network where users share files and data on one server is a common scheme in workplaces. However, the advantages of networks are so great that the many of people desire the ability to be connected to networks from multiple physical locations. Remote network connections provide users with opportunities 'to be connected' from many locations throughout the world with the right set of tools, e.g., computer, modem, phone line, etc. However, remote networking uses external wide area network communications links to other physical locations across town or country, and it is not always a simple task to design such a remote network access system with the acceptable performance. Busy phone line signals, unconnected modems, password problems, interrupted network connection sessions reduce the level of performance of the remote network connection and cause frustration in users. In short, the quality of network connections may vary due to a number of factors.

Thus, it would be desirable to provide a system that would reduce the above stated problems and provide high quality remote network connections.

SUMMARY OF THE INVENTION

The present invention discloses a method and apparatus for remote network connection service quality monitoring. In one embodiment of the present invention, a network connection is established via a first network connection point identified within a first priority list of a plurality of network connection points. The network connection performance data related to the establishment of the network connection is received. Based on the received network performance data a second priority list of the plurality of network connection points is modified.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Although the present invention is described below by way of various embodiments that include specific structures and methods, embodiments that include alternative structures and methods may be employed without departing from the principles of the invention described herein.

In general, embodiments described below feature a network-based application that collects remote network connection performance data and modifies a priority list of network connection points based on the collected data. A preferred embodiment of the present invention features a network-based application for monitoring quality of remote network connections.

Network-related Technology

Figure 5:
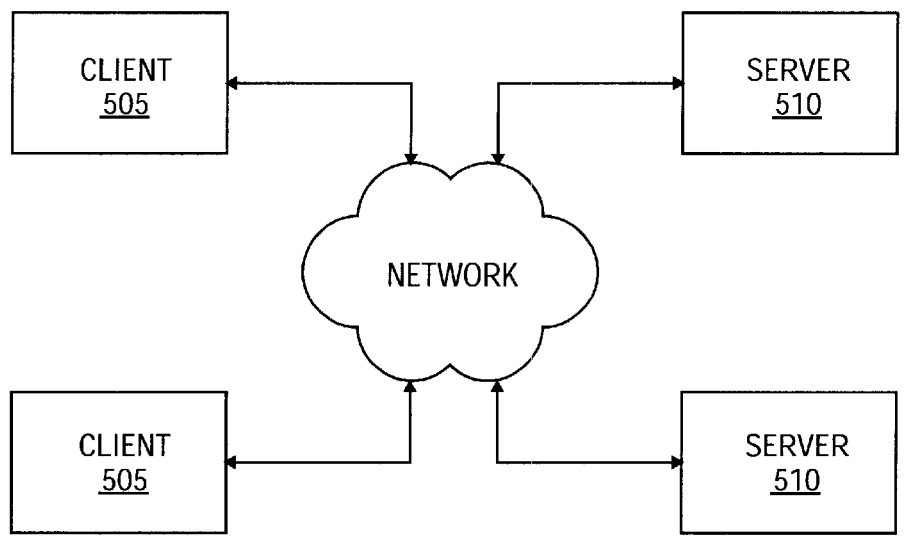
FIG. 5 a diagram of a traditional client-server system upon which one embodiment of the present invention may be implemented.

Before describing embodiments of the present invention in detail, it may be helpful to discuss some of the concepts on which the present invention is based. A component of one embodiment of the present invention is a computer server. Servers are computer programs that provide some service to other programs, called clients. A client 505 and server 510 of FIG. 5 communicate by means of message passing often over a network 500, and use some protocol, (i.e., a set of formal rules describing how to transmit data), to encode the client's requests and/or responses and the server's responses and/or requests. The server may run continually waiting for client's requests and/or responses to arrive or some higher level continually running server that controls a number of specific servers may invoke it. Client-server communication is analogous to a customer (client) sending an order (request) on an order form to a supplier (server) dispatching the goods and an invoice (response). The order form and invoice are part of the protocol used to communicate in this case.

Figure 6:
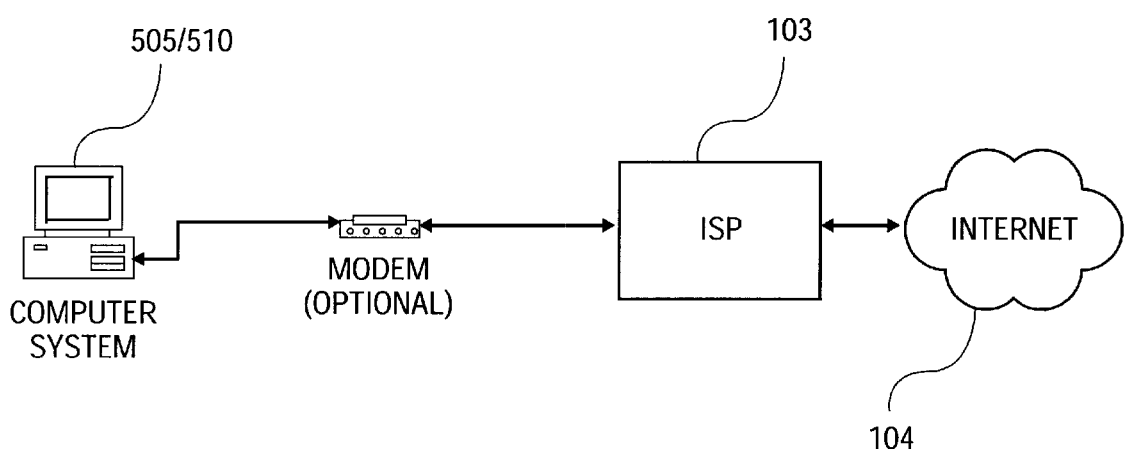
FIG. 6 is a diagram illustrating a process of connection to the Internet utilizing an Internet Service Provider (ISP) according to one embodiment of the present invention. The connection could be dial-up, IDSN, DSL, wireless, etc.

Another component of one embodiment the present invention is an Internet Service Provider (ISP). An ISP is a service that provides access to the Internet. For a monthly fee, a service provider gives a customer a software package, username, password and Internet access phone number. Equipped with a modem (e.g., a dial-up, DSL, ISDN or wireless), a customer can then log onto the Internet and browse the World Wide Web (WWW) and USENET, send and receive e-mail, and access a particular network. In addition to serving individuals, ISPs also serve large companies, providing a direct connection from the company's networks to the Internet. ISPs themselves are connected to one another through Network Access Points (NAPs). NAP is a public network exchange facility where ISPs can connect with one another in peering arrangements. The NAPs are a key component of the Internet backbone because the connections within them determine how traffic is routed. They are also the points of most Internet congestion. An exemplary diagram of customer to ISP relation is shown in FIG. 6.

ISPs generally provide a plurality of Point of Presence gateways (POP) in order for a customer to gain an Internet access by making a local call. A POP (point-of-presence) is an access point to the Internet that is associated with a phone number. A connection established via such a POP causes a unique IP address to be assigned to a machine that accesses the Internet utilizing the established connection. The number of POPs that an ISP has and the number of subscribers are usually used as a measure of its size or growth rate.

Yet another component one embodiment of the present invention is a servlet. Servlets are Java applications, which run on a Web server or application server and provide server-side processing, typically to access a database. It is a Java-based alternative to Common Gateway Interface (CGI) scripts, interface programs, usually written in C or PERL, which enables an Internet server to run external programs to perform a specific function. The most important difference between servlets and CGI scripts is that a Java servlet is persistent. This means that once it is started, it stays in memory and can fulfill multiple requests. In contrast, a CGI script disappears once it has fulfilled a request.

Architecture

Figure 1:
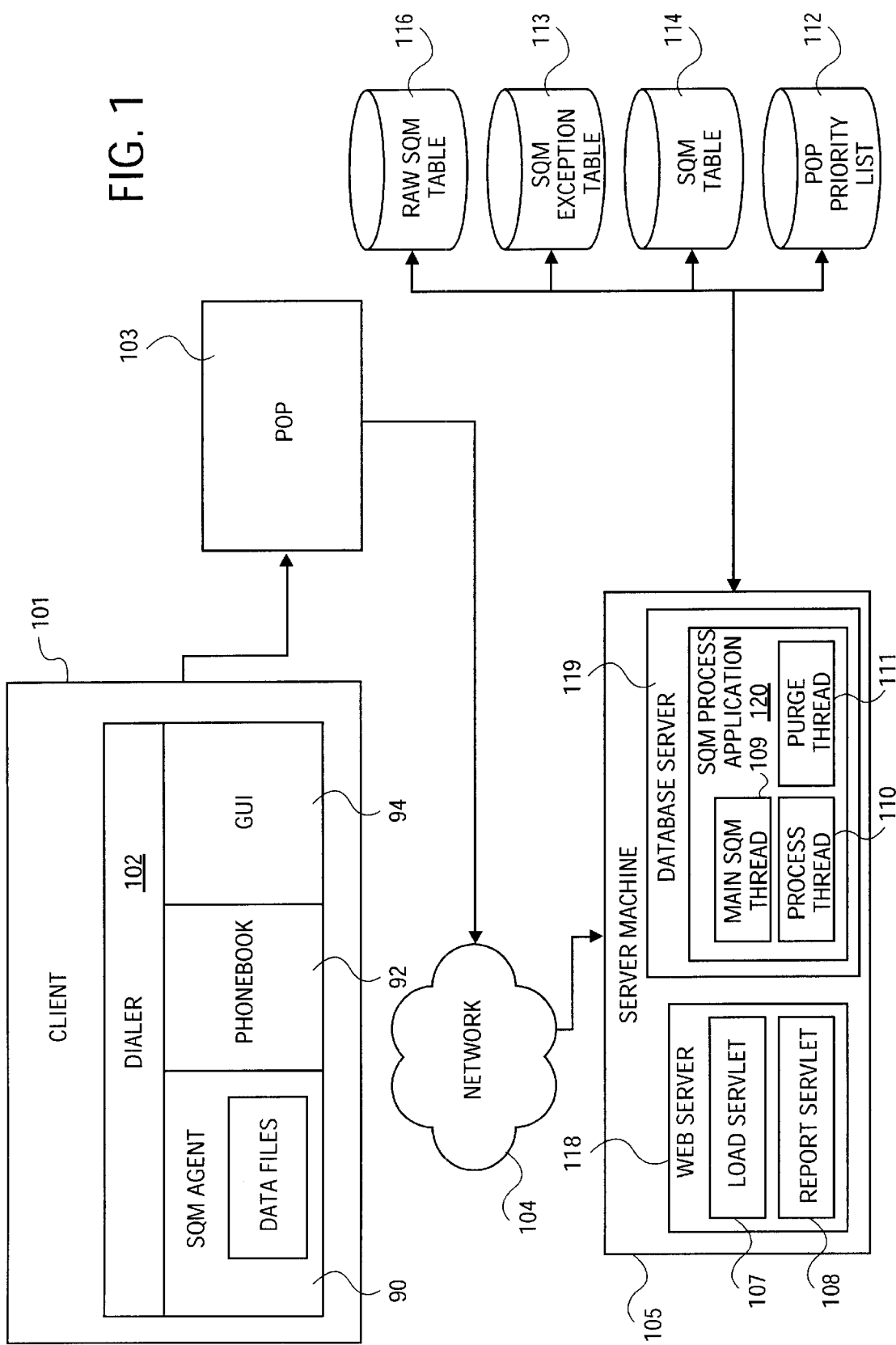
FIG. 1 is a diagram of a system architecture according to one embodiment of the present invention.

With these concepts in mind, an embodiment of a system architecture of the present invention can be explored. A remote network connection can be established from a client machine 101 of FIG. 1 that runs a dialer 102 to establish a network connection via a POP 103 and network 104 and to collect network connection performance data. The Dialer 102 includes (1) a Service Quality Management (SQM) agent 90 for collecting network connection performance data and for maintaining files storing the collected information, (2) phonebook 92, which includes a copy of a POP priority list 112 that may be stored at a server machine 105 and (3) a Graphical User Interface 94 that allows a user to identify his/her current location and select an access point in order for the Dialer 102 to apply local dialing rules, enter user name and password, and connect to the Internet and corporate Virtual Private Network (VPN).

In one embodiment of the present invention the server machine 105 includes a Web Server 118 and a Database Server 119. The Web Server 118 includes such components of the present invention as Load Servlet 107 and Report Servlet 108 database applications. The Database Server 119 includes an SQM Process Application 120 consisting of a Main SQM Thread 109, Process Thread 110 and Purge Thread 111. These components are responsible for storing and normalizing data for service quality analysis. It will be appreciated that these components may run on a single server.

In an embodiment of the present invention, database tables for storing collected and analyzed data, (e.g., Raw_SQM Table 115, SQM Table 114, POP priority list 112) are also stored at the server machine 105. However, it will be appreciated that databases may be stored at other machines and database data may be uploaded to the server machine 105 when necessary.

Methodology

Figure 2:
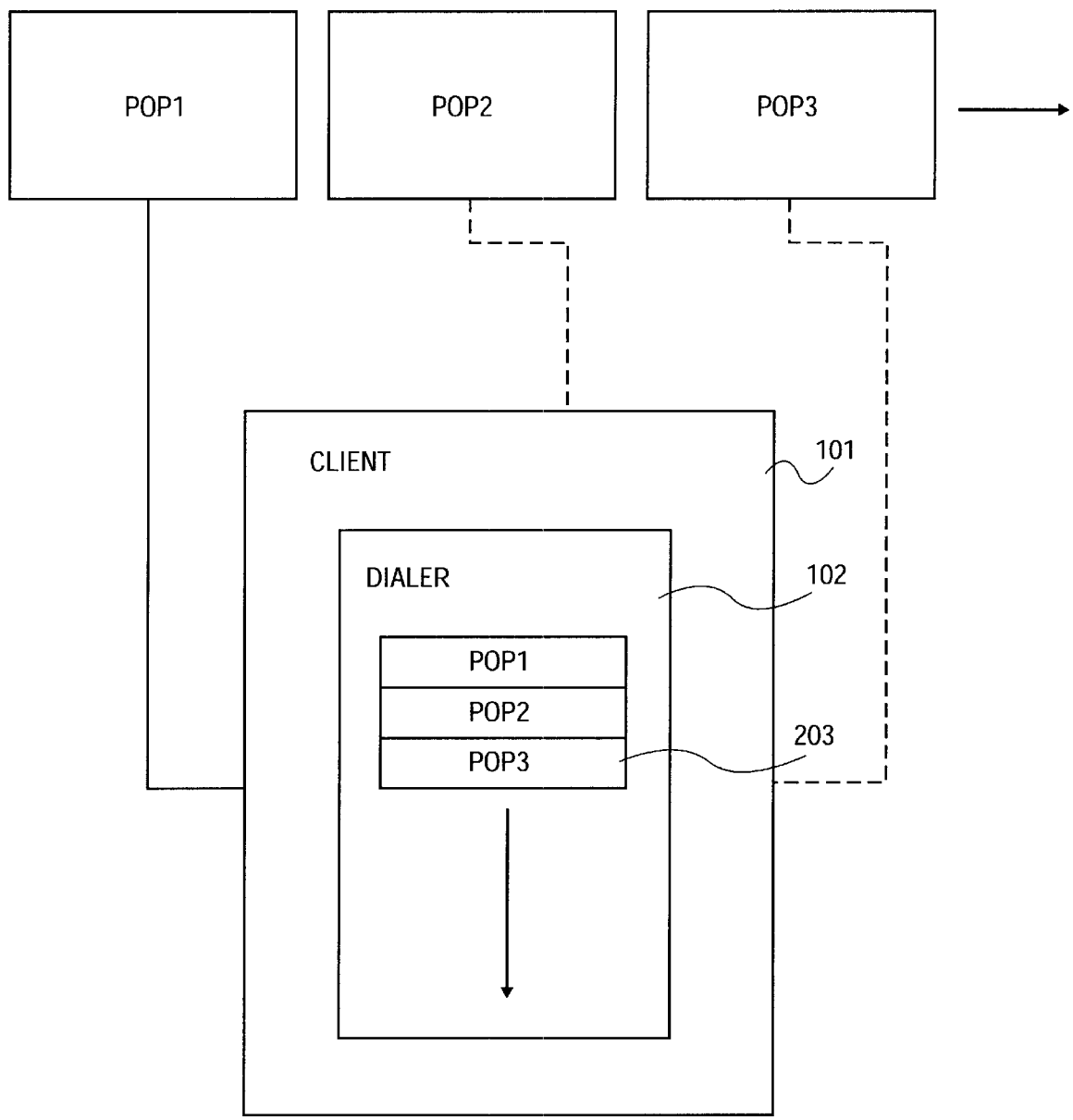
FIG. 2 is an entity relationship diagram between a client machine and a plurality of point-of-presence gateways (POPs) according to one embodiment of the present invention.

With these concepts in mind, an exemplary embodiment of the present invention can be further explored. In one embodiment of the present invention a user invokes a Dialer 102 at the client machine 101 of FIG. 2. The Dialer 102 attempts to establish a connection with one of the POPs in a priority order established in the POP priority list 203. For example, if POP1 is not available then the Dialer 102 selects the next POP (POP2) from the list and attempts to establish a network connection with POP2 and so on.

Figure 3A:
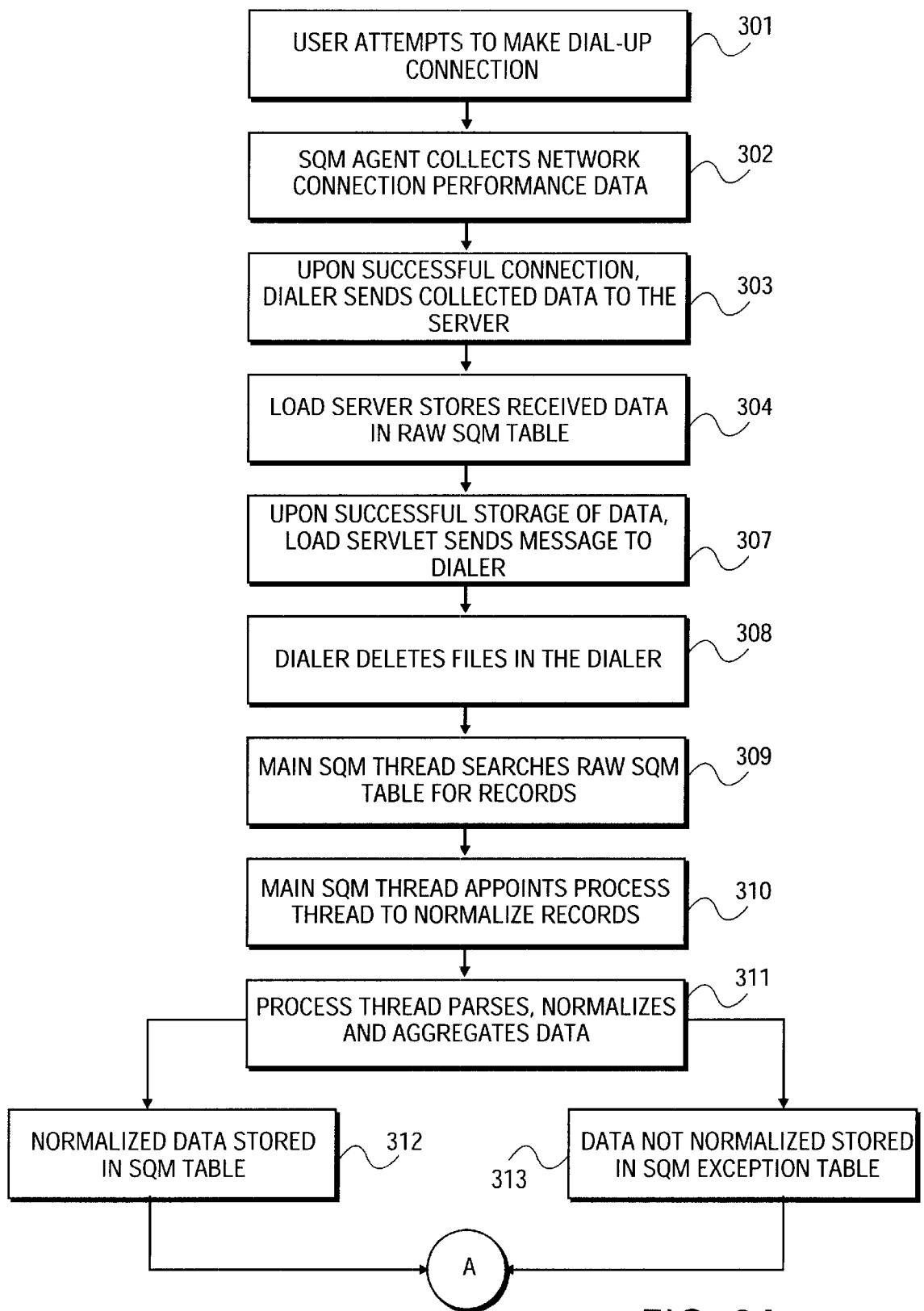
FIGS. 3A and B show a flow diagram illustrating server side processes and client side processes utilized in updating a POP priority list according to one embodiment of the present invention.
Figure 3B:
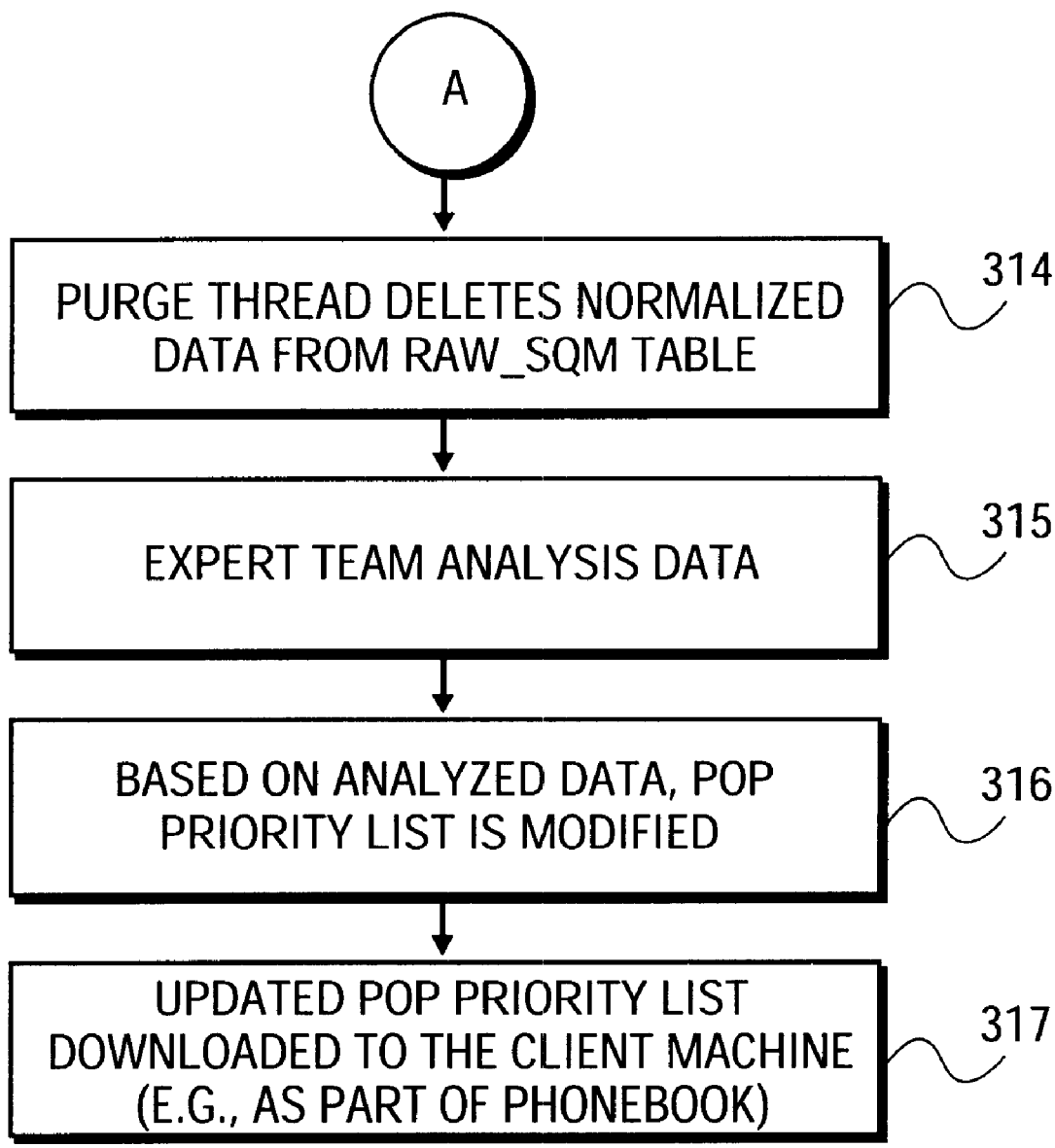

The next embodiment of the present invention is described with the reference to a simplified flow diagram shown in FIGS. 3A and 3B. At operation 302, the SQM agent 90 collects network connection performance data of a number of POPs with which the Dialer 102 attempts to establish a connection and stores the data in the files on the client machine 101. In an embodiment of the present invention, the network connection performance data includes a number of parameters related to a user, software and hardware configurations of a client machine 101, a user location, a network access location (e.g., a location dialed by modem), the timing of various operations in a connection process, POP related information, client and server IP addresses, baud rates, and error codes reflecting connection errors.

An exemplary listing of parameters that may be collected as part of the network connection performance data is provided below in Table 1:

TABLE 1 user identity
user login string
authenticating customer identifier
connection type
dial start time
dial end time
time taken to connect
VPN start time
VPN stop time
VPN time taken
time taken for modem negotiations
baud rate
operating system version of a dialing platform
RAS version
RAS device type
RAS device name
software compression
PPP LCP extensions
tool used to connect
dialer type
dialer version
dialer profile identifier
source country code, area code, location string the user is a dialing from
destination country code, area code
destination phone dial string
pop identifier
pop type
pop City location
pop state identifier
pop country code
pop phone
script used when dialing
remote server IP address
client IP address
download start (collected if test file downloaded)
download stop
download speed
error code of the user received on connection The error codes returned to the user upon a connection attempt may broadly be divided into three categories namely (1) successful dial in connection, (2) user errors and (3) network problems. The user errors typically occur due to a user name and password problems, missing or disconnected modems, incorrect dialing codes, or incorrect or hand-edited phone numbers. Examples of the user errors include:

1. Access denied due to invalid user name or password;
2. The user cancelled operation;

3. Device/configurations error (e.g., port not ready, port already opened, modem not connected, no dial tone detected); and
4. Person answered instead of modem (e.g., incorrect phone number dialed).

Examples of network errors include:
1. Line busy;
2. No answer;
3. PPP time out;
4. Connection dropped;
5. Remote access server not responding; and
6. Port disconnected by remote computer.

When a successful network connection with one of the POPs is established, the SQM agent 90 transmits the collected data to the server machine 105. In one embodiment of the present invention, the Dialer 102 selects one of the available servers for data transmission based on a data load, thus performing a load balancing function.

In one embodiment of the present invention, the SQM agent 90 collects network connection performance data relating to every POP via which it tries to establish a network connection. Upon establishment of a successful network connection with one of the POPs, the SQM agent 90 composites a message comprising network connection performance data along with software and hardware configuration data and the POP identification numbers to which the network connection performance data relates and transmits the message to the server 105.

The Web Server 118, upon receiving the collected data at the server machine 105, at operation 304 invokes the Load Servlet 107 that stores received data in the RAW SQM table 116. After the network connection performance data is successfully stored in the RAW SQM table, at operation 307 the Load Servlet 107 sends a message to the Dialer 102 at the client machine 101 with the code number symbolizing successful storage of data on the server machine 105. At operation 308, the Dialer 102 deletes data in the files stored at the client machine 101 upon receiving the message with the code number. At operation 309, the Database Server 119 invokes the SQM Process Application 120, which invokes the Main SQM Thread 109. The Main SQM Thread 109 searches RAW SQM table 116 for records, which have not been processed, and at operation 310 appoints the Process Thread 110 to normalize the data from the RAW SQM table. In one embodiment of the present invention the Process Thread 110, at operation 311, performs data normalization by parsing the data and adding a customer identification number and FOP identification number to the data. The Process Thread 110 then stores normalized data in the SQM table 114 at operation 312. If the data has errors or customer identification number cannot be identified, the data is stored in an SQM Exception table 113 at operation 313.

At operation 311, the process thread may further optionally aggregate and process the normalized data, so as to facilitate convenient analysis thereof. For example, totals may be generated for particular types of errors for each of multiple POPs, averages may be generated for performance measures (e.g., baud rate), and access times may be calculated. Further, totals and averages may also be calculated based on other criteria, such as time, date and geographical criteria. The data in the SQM Exception table 113 is reviewed manually and re-processed or discarded. The Process Thread 110 marks the normalized records in the RAW SQM table 116. The Purge Thread 111 runs periodically and searches the RAW SQM table 116 for the marked records and deletes them at operation 314.

At operation 315 the data stored in the SQM table 114, reflecting POP performance information collected by multiple clients, is ready for human access. In one embodiment a data summarization process is performed on the data in the SQM table 114 to support data analysis and reporting. Multiple tables that contain summarized data are generated as a result of the summarization process that may run on a separate server. The variety of queries and reports can be generated at this point. In one embodiment of the present invention, the types of the reports that are available are: list of single POPs by phone number with the performance information, list of POP groups with the performance information on a group of POPs, end user assistance report including a variety of data on the user, e.g. quantity of dial-ins a day, number of password problems, etc., customer Service Level Agreement (SLA) performance information by month. It will be appreciated that these reports may be generated manually by human operators and automatically by components running on the server machine 105.

At operation 316 a team of experts monitors the collected network performance data and analyzes it periodically. The team's purpose is to identify the network connection problems experienced by the user and proactively respond before the remote network connection service is noticeably affected. Any suspected problems may be tested using a dialer application. A group of phone numbers, representing POPs with problematic performance, may be loaded into the dialer application for test purposes and the dialer application may dial each one in order to check POPs performance. Based on the test results and on the collected network performance data any POPs that are not performing to the quality standards may be moved to the end of the POP Priority List 112. The POP Priority List 112 may be sorted by using a number of different criteria such as quality rating, speed, price, provider, etc. These sorting criteria may be applied at an individual city level as well as on the entire phonebook level. In one embodiment manually selected sort order within a city may also be applied. The above process facilitates the identification of the best performing POPs for any given area and the assignment to such best performing POPs of a high priority number. At the same time, low performing POPs may be identified, and assigned a lower priority number. In an embodiment of the present invention if the quality of service of a POP is so poor that it is not worth maintaining in the POP Priority List 112, the expert team deletes the POP from the list temporarily until the POP's performance is improved. It will be appreciated that the analysis and POP Priority List 112 can be updated automatically without human help by developing an application that updates the POP Priority List 112 based on an advanced-specified criteria. For example, the criteria may be an acceptable average number of failed attempts to establish a network connection a day, or an acceptable number of interrupted network connection sessions, etc.

Figure 4:
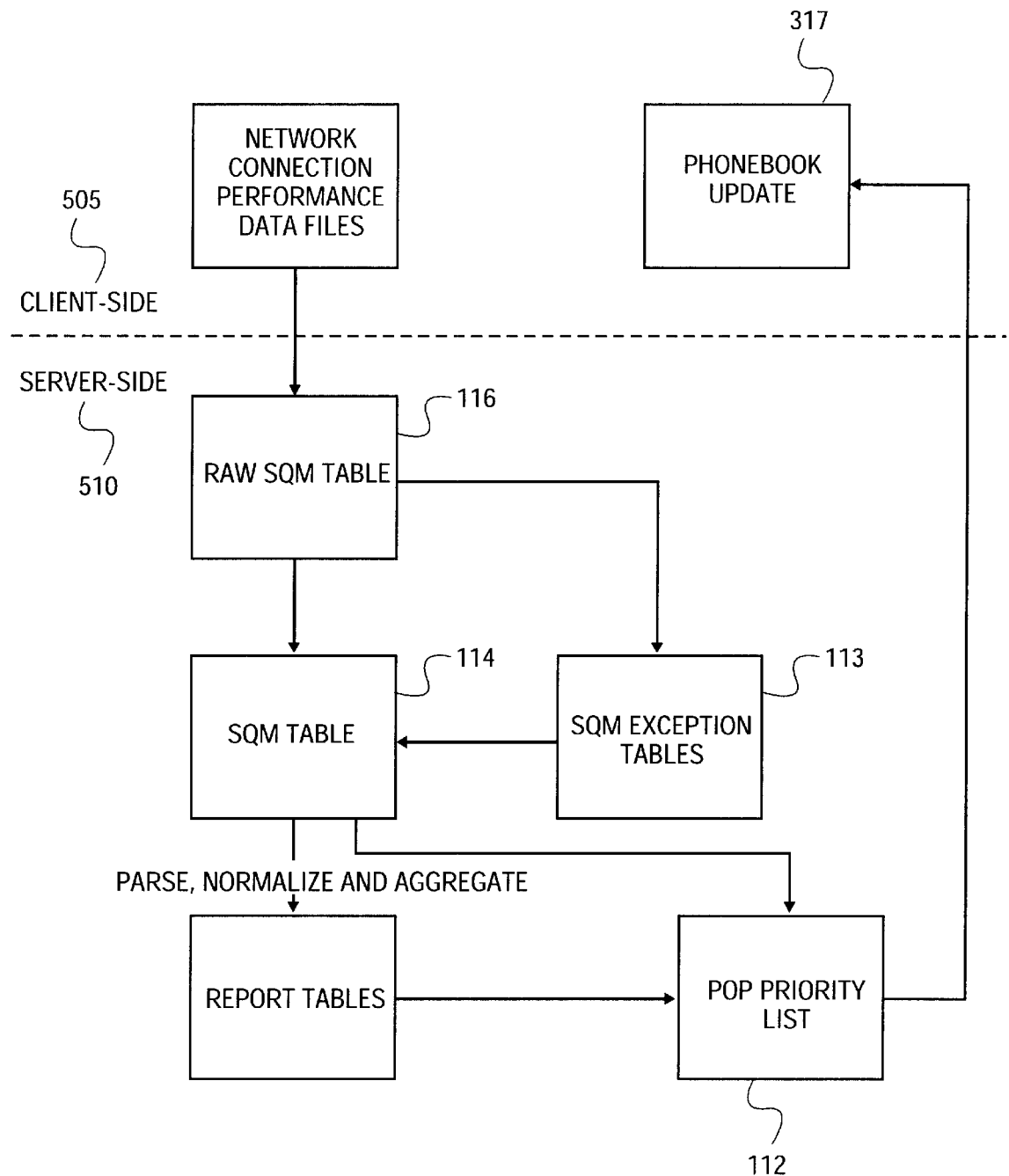
FIG. 4 is a data flow diagram according to one embodiment of the present invention.

At operation 317 the phonebook 92 on the client machine 101 is automatically updated after the user establishes a successful Internet connection. The updating of the phonebook 92 may be performed by modifying an existing phonebook 92 stored on the client machine 101, or may be performed by uploading a complete and new phonebook 92, as generated on the server machine 105, to the client machine 101. For example, upon the generation of a complete and new phonebook 92, the new phonebook 92 may be "pushed out" from the server machine 105 to multiple client machines 101. In one embodiment of the present invention, the user may choose not to receive an automatic update of the phonebook 92. In this embodiment the user may access a Web site maintained at the server machine 105 where a copy of the latest phonebook may be viewed and downloaded. An exemplary data flow diagram of the above-described process is illustrated in FIG. 4.

It will be appreciated that the operations 315–317 may be automated, with certain criteria extracted from the collected connection performance data being used automatically to prioritize POPs. Such criteria may include any of the information items identified above, and the automated process may be customizable so as to allow certain criteria to be user-selected to be prominent in the prioritization of POPs. The prioritization of POPs may be even performed according to any number of well-known ranking or prioritization algorithms.

It will be appreciated that the above described database applications do not need to run on the server machine 105. The above-described process may run on the client machine 101 with an automatic POPs performance analysis.

Moreover, the above described databases and tables do not need to be stored at the server machine 105. They may be stored at other machines that are accessible by the server machine 105 and uploaded to the server machine 105 when necessary.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method including:
    at a client, establishing a network connection via a first network connection point, the first network connection point being selected by the client according to a first priority list of a plurality of network connection points, wherein the first priority list is utilized by the client to identify and prioritize the plurality of network connection points;
    at the server, receiving network connection performance data related to the network connection;
    at a server, modifying a second priority list of the plurality of network connection points based on the network connection performance data; and
    at the server, downloading the modified second priority list of the plurality of network connection points to the client to update the first priority list of the plurality of network connection points, utilizing the modified second priority list,
    wherein the modifying of the second priority list of the plurality of network connection points at the server further includes assigning a higher priority level, within the modified second priority list, to a better performing network connection point than is assigned to a poor performing network connection point.

2. The method of claim 1 wherein the network connection performance data is received at the server from the client via a network and includes performance records relating to multiple network connection points of the plurality of network connection points.

3. The method of claim 1 including establishing multiple network connections via a single connection point and wherein the network connection performance data is received at the server from multiple clients via a network.

4. The method of claim 1 further including, at the client, collecting the network connection performance data.

5. The method of claim 1 wherein the plurality of network connection points comprise a plurality of point-of-presence gateways (POPs).

6. The method of claim 1 including, at the client, establishing a further connection via a second network connection point, the second network connection being selected by the client according to the first priority list of the plurality of network connection points when the first network connection point is unavailable.

7. The method of claim 4 wherein the collecting of the network connection performance data further includes storing the network connection performance data in at least one file.

8. The method of claim 7 wherein the at least one file is stored at the client.

9. The method of claim 1 further includes transmitting the network connection performance data from the client to the server via a network upon an establishment of the network connection.

10. The method of claim 1 wherein the network connection performance data indicates an error at an access device of a user.

11. The method of claim 10 wherein the error at the access device includes at least one of a group including a user error, a software error and a hardware error.

12. The method of claim 1 wherein the network connection performance data indicates a network error.

13. The method of claim 12 wherein the network error comprises a network media error.

14. The method of claim 1 further including storing the modified second priority list of the plurality of network connection points on a Web site.

15. The method of claim 1 including normalizing the network connection performance data to facilitate the modification of the second priority list of the plurality of network connection points.

16. The method of claim 1 including processing the network connection performance data to facilitate the modification of the second priority list of the plurality of network connection points.

17. The method of claim 16 wherein the processing of the network connection performance data includes aggregating the network connection performance data.

18. A method including:
    establishing a network connection via a first network connection point, the first network connection point being selected according to a priority list of a plurality of network connection points, wherein the priority list is utilized to identify and prioritize the plurality of network connection points;
    collecting network connection performance data;
    modifying the priority list of the plurality of network connection points based on the collected network connection performance data; and
    communicating the modified priority list of the plurality of network connection points to a client;
    wherein the modifying of the priority list of the plurality of network connection points further includes assigning a higher priority level, within the priority list, to a better performing network connection point than is assigned to a poor performing network connection point.

19. The method of claim 18 wherein the network connection performance data indicates an error at an access device of a user.

20. The method of claim 19 wherein the error at the access device includes at least one of a group including a user error, a software error and a hardware error.

21. The method of claim 18 wherein the network connection performance data indicates a network error.

22. The method of claim 21 wherein the network error comprises a network media error.

23. The method of claim 18 including establishing a further connection via a second network connection point selected from the priority list of the plurality of network connection points when the first network connection point is unavailable.

24. The method of claim 18 wherein the modifying of the priority list of the plurality of network connection points includes normalizing the network connection performance data.

25. The method of claim 24 wherein the network connection performance data indicates a network error.

26. The method of claim 25 wherein the network error comprises a network media error.

27. A method including:
  at a client, establishing a network connection via a first network connection point, the first network connection point being selected by the client according to a priority list of a plurality of network connection points, wherein the priority list is utilized by the client to identify and prioritize the plurality of network connection points;
  at the client, collecting network connection performance data;
  at the client, transmitting the network connection performance data to a server via a network; and
  at the client, receiving a modified priority list of the plurality of network connection points, the modified priority list to update the priority list of the plurality of network connection points and having been generated utilizing the network connection performance data.

28. The method of claim 27 wherein the network connection performance data indicates an error at an access device of a user.

29. The method of claim 28 wherein the error at the access device includes at least one of a group including a user error, a software error and a hardware error.

30. The method of claim 27 including, at the client, establishing a further connection via a second network connection point according to the priority list of the plurality of network connection points when the first network connection point is unavailable.

31. The method of claim 27 wherein the transmitting of the network connection performance data to the server via the network further includes transmitting the network performance data upon an establishment of the network connection.

32. A method including:
  at a server, receiving network connection performance data via a network;
  at the server, modifying a priority list of a plurality of network connection points based on the received network connection performance data; and
  at the server, downloading the modified priority list of the plurality of network connection points to a client to update a local priority list of the plurality of network connection points, stored at the client, utilizing the modified priority list,
wherein the priority list is utilized to identify and prioritize the plurality of network connection points, and wherein the modifying of the priority list of the plurality of network connection points further includes assigning a higher priority level, within the modified priority list, to a better performing network connection point than is assigned to a poor performing network connection point.

33. The method of claim 32 wherein the network connection performance data is received from a plurality of clients.

34. The method of claim 32 including normalizing the network connection performance data.

35. The method of claim 32 including processing the network connection performance data.

36. The method of claim 35 wherein the processing of the network connection performance data includes aggregating the network connection performance data.

37. A system comprising:
  a network;
  a server machine; and
  a client machine, coupled to the server machine via the network, to establish a network connection via a first network connection point according to a first priority list of a plurality of network connection points, to collect network connection performance data, and to transmit the network connection performance data to the server machine via the network,
wherein the server machine is to modify a second priority list of the plurality of network connection points based on the collected network connection performance data,
wherein the server machine is to download the modified second priority list of the plurality of network connection points to the client machine, and the client machine is to update the first priority list of the plurality of network connection points, utilizing the modified second priority list,
wherein the first priority list is utilized by the client machine to identify and prioritize the plurality of network connection points, and
wherein the modifying of the second priority list of the plurality of network connection points by the server machine further includes assigning a higher priority level, within the modified second priority list, to a better performing network connection point than is assigned to a poor performing network connection point.

38. The system of claim 37 wherein the client machine is to establish a further connection via a second network connection point according to the priority list of the plurality of network connection points when the first network connection point is unavailable.

39. The system of claim 37 wherein the network connection performance data indicates an error at an access device of a user.

40. The system of claim 39 wherein the error at the access device includes at least one of a group including a user error, a software error and a hardware error.

41. The system of claim 37 wherein the network connection performance data indicates a network error.

42. The system of claim 41 wherein the network error comprises a network media error.

43. An apparatus including:
  means for receiving network connection performance data related to the establishment of a network connection;
  means for modifying a priority list of the plurality of network connection points based on the network connection performance data; and
  means for downloading the modified priority list of the plurality of network connection points to a client to update a local priority list of the plurality of network connection points, stored at the client, utilizing the modified priority list,
wherein the local priority list is utilized to identify and prioritize the plurality of network connection points and wherein the modifying of the priority list of the plurality of network connection points further includes assigning a higher priority level, within the modified priority list, to a better performing network connection point than is assigned to a poor performing network connection point.

44. A system including:

a network; and a server machine, coupled to the network, to receive network connection performance data via the network, to modify a priority list of a plurality of network connection points based on the received network connection performance data, and to download the modified priority list, of the plurality of network connection points, to a client to update a local priority list, of the plurality of network connection points, stored at the client utilizing the modified priority list, wherein the modified priority list is utilized by the client to identify and prioritize the plurality of network connection points and wherein the server is to modify the priority list of the plurality of network connection points by assigning a higher priority level, within the modified priority list, to a better performing network connection point than is assigned to a poor performing network connection point.

* * * * *

UNITED STATES PATENT AND TRADEMARK OFFICE
CERTIFICATE OF CORRECTION

PATENT NO. : 6,510,463 B1  Page 1 of 1
DATED : January 21, 2003
INVENTOR(S) : Farhat et al.

It is certified that error appears in the above-identified patent and that said Letters Patent is hereby corrected as shown below:

Column 5,
Line 49, delete "FOP" and insert -- POP --.

Signed and Sealed this

Eighth Day of April, 2003

JAMES E. ROGAN
*Director of the United States Patent and Trademark Office*